(12) United States Patent
Changlani et al.

(10) Patent No.: US 11,388,137 B1
(45) Date of Patent: Jul. 12, 2022

(54) DERIVATION OF BASIC SERVICE SET IDENTIFIERS FOR ACCESS POINTS

(71) Applicant: HEWLETT PACKARD ENTERPRISE DEVELOPMENT LP, Houston, TX (US)

(72) Inventors: Nitin A. Changlani, Santa Clara, CA (US); Jingong Li, Santa Clara, CA (US); Manoj Thawani, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 41 days.

(21) Appl. No.: 17/125,799

(22) Filed: Dec. 17, 2020

(51) Int. Cl.
  *H04L 61/50* (2022.01)
  *H04W 88/08* (2009.01)
  *H04W 76/11* (2018.01)
  *H04L 101/622* (2022.01)

(52) U.S. Cl.
  CPC ............ *H04L 61/20* (2013.01); *H04W 76/11* (2018.02); *H04L 61/6022* (2013.01); *H04W 88/08* (2013.01)

(58) Field of Classification Search
  None
  See application file for complete search history.

(56) References Cited

U.S. PATENT DOCUMENTS

| 10,624,154 B2 * | 4/2020 | Li ................... H04W 74/002 |
| 2016/0073440 A1 * | 3/2016 | Pallen ............... H04W 76/15 370/329 |
| 2021/0160695 A1 * | 5/2021 | Sivakumar ........... H04W 80/02 |
| 2021/0392192 A1 * | 12/2021 | Machikoppa ....... H04L 67/2842 |

\* cited by examiner

*Primary Examiner* — Kenny S Lin
(74) *Attorney, Agent, or Firm* — Sheppard Mullin Richter & Hampton LLP (57) ABSTRACT

An access point of a network configured to derive basic service set identifiers (BSSIDs). The access point determines a base media access control (MAC) address associated with an access point. The access point computes an offset for at least one radio of the access point. The access point determines a radio-specific MAC address for the at least one radio of the access point by incrementing the base MAC address by the offset. The access point then derives a plurality of BSSIDs for the at least one radio of the access point based on the radio-specific MAC address. In some cases, the access point determines a radio from which a BSSID is provided based on the BSSID.

20 Claims, 6 Drawing Sheets

Computing Component 300

Hardware Processor(s) 302

Machine Readable Storage Media 304 — 306

```
m % max_radios
v % max_bssids_per_radio e = (base_mac << 4) >> 4 for each radio_id r in {0, 1, ..., (m-1)}:
    offset = (m + r - (e mod m)) mod m
    radio_base_mac = base_mac + offset                308
```

```
    radio_base_mac = radio_base_mac << ceil(log2(v))
    radio_base_mac = radio_base_mac ^ 0x800000 j = 0
    for each bssid b in {0, 1, ..., (v-1)}:
        b = radio_base_mac + j
        j = j + 1
    end
end                                                  310
```

FIG. 3

Computing Component 400

Hardware Processor(s) 402

Machine Readable Storage Media 404

406

```
m % max_radios
v % max_bssids_per_radio radio_base_mac = (bssid ^ 0x800000) >> ceil(log2(v))
radio_id = radio_base_mac mod m
```

FIG. 4

Computing Component 500

Hardware Processor(s) 502

Machine-Readable Storage Media 504

Determine a base media access control (MAC) address associated with an access point
506

Compute an offset for at least one radio of the access point
508

Determine a radio-specific MAC address for the at least one radio of the access point by incrementing the base MAC address by the offset
510

Derive a plurality of BSSIDs for the at least one radio of the access point based on the radio-specific MAC address
512

DERIVATION OF BASIC SERVICE SET IDENTIFIERS FOR ACCESS POINTS

DESCRIPTION OF RELATED ART

Access points allow client devices to wirelessly connect to a network. An access point provides one or more basic service set identifiers (BSSIDs) to which client devices with proper login credentials may connect to in order to access the network. BSSIDs provided by an access point are derived from a media access control (MAC) address associated with the access point.

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments.

The figures are not exhaustive and do not limit the present disclosure to the precise form disclosed.

DETAILED DESCRIPTION

Client devices can wirelessly access a network through access points. An access point can provide one or more basic service set identifiers (BSSIDs) to which client devices with proper login credentials may connect to in order to access the network. Under current approaches, BSSIDs provided by an access point can be derived based on a media access control (MAC) address of the access point. For example, an access point can be assigned a unique MAC address by a manufacturer of the access point. The access point can derive BSSIDs by performing bitwise operations on the MAC address. Current approaches of deriving BSSIDs based on a MAC address of an access point work well under current implementations of current wireless standards because they do not generally support more than two radios per access point and 16 BSSIDs per radio. However, as wireless standards evolve toward maximizing wireless efficiency, access points can eventually support more than two radios per access point and more than 16 BSSIDs per radio. However, the current approaches of deriving BSSIDs cannot be scaled to support advancements in wireless standards. As such, various embodiments discussed below provide for BSSID derivation based on a MAC address of an access point, where the access point may have any number of radios and any number of BSSIDs per those radios.

Described herein are solutions that address the problems described above. In various embodiments, an access point can include an basic service set identifier (BSSID) assignment module. The BSSID assignment module can obtain a media access control (MAC) address of the access point from a data store associated with the access point. Based on the MAC address, the BSSID assignment module can determine a base MAC address associated with the access point. The BSSID assignment module can then determine a radio-specific MAC address for each radio of the access point based on the base MAC address. From the radio-specific MAC address, the BSSID assignment module can derive a plurality of BSSIDs for each radio of the access point. Unlike the current approach of deriving BSSIDs where derivations of BSSIDs are limited to access point with just 2 radios and 16 BSSIDs per radio, and as alluded to above, the solutions provided herein can derive BSSIDs for access points with any number of radios and any number of BSSIDs per radio. Thus the solutions provided herein can scale to adapt to various evolutions in wireless standards. These and other features of the solutions are discussed herein.

Figure 1:
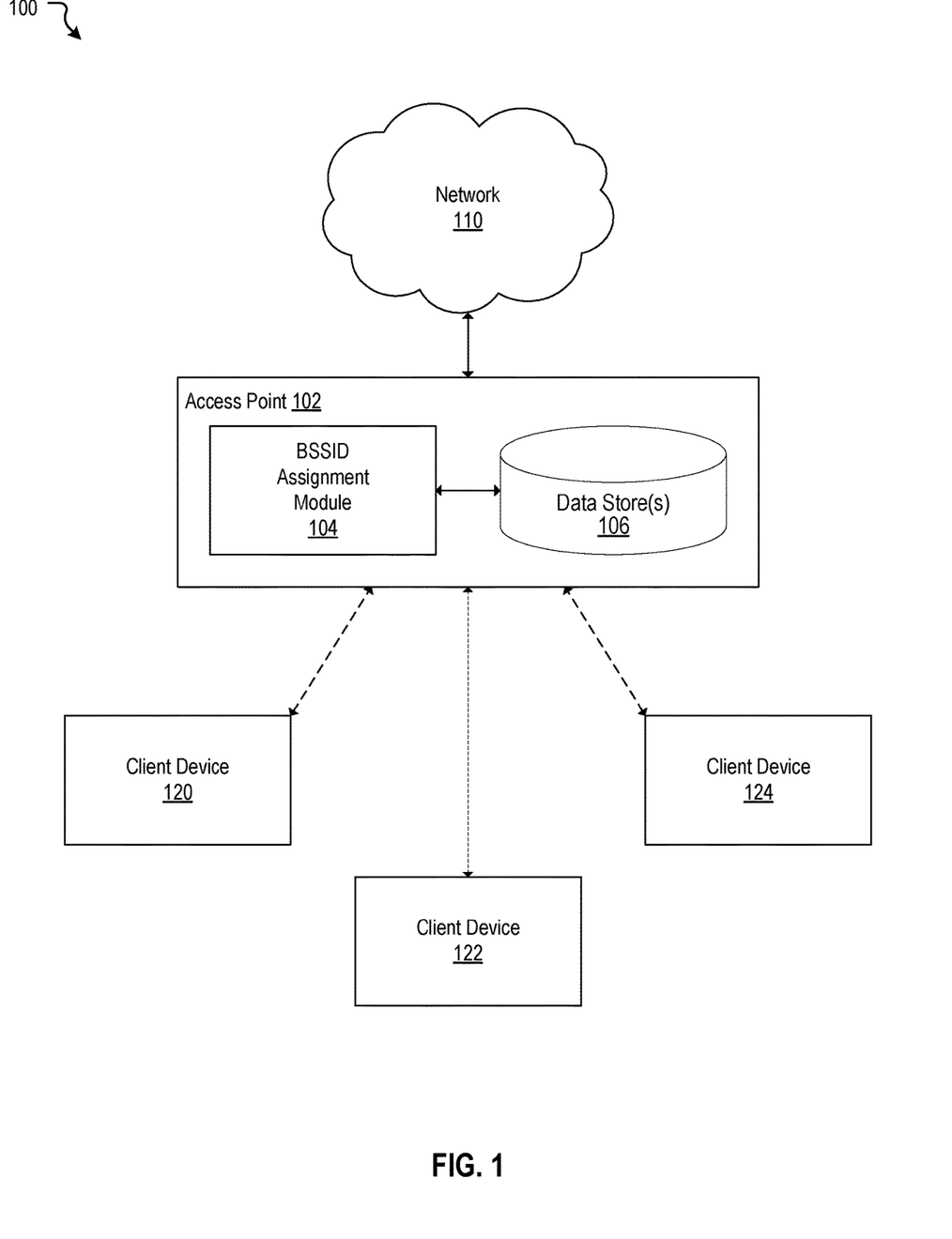
FIG. 1 illustrates an example network architecture in accordance with various embodiments of the present disclosure.

FIG. 1 illustrates an example network architecture 100 in accordance with various embodiments of the present disclosure. As shown in FIG. 1, in some embodiments, the network architecture 100 can include an access point 102 communicatively coupled to a network 110. The access point 102 can be coupled to the network 110 through various linked layers. For example, in some embodiments, the access point 102 may be coupled to the network 110 though an ethernet connection (e.g., IEEE 802.3). In some embodiments, the access point 102 may be coupled to the network 110 through a Wi-Fi (e.g., IEEE 802.11), Bluetooth (e.g., IEEE 802.15.1), or cellular connection (e.g., long-term evolution, 5th generation cellular networks, etc.). Many variations are possible. In some embodiments, the network architecture 100 can further include client devices 120-124. The client devices 120-124 can be configured to wirelessly access the network 110 through the access point 102. For example, in some embodiments, the network 110 can be the internet and the client devices 120-124 can be computing devices, such as computers, mobile phones, tablet devices, etc. In this example, the client devices 120-124 can wirelessly access the internet through the access point 102. In some embodiments, the network 110 can be an enterprise intranet (e.g., a private network) and the client devices 120-124 can wirelessly access data files or other enterprise data through the access point 102. In general, the access point 102 can be considered as a node of the network 110 and the access point 102 can be configured to perform various functions of the network 110. For example, as discussed, the access point 102 can be configured as an access point that allows the client devices 120-124 to wirelessly access the network 110. In some cases, the access point 102 can be configured as a bridge that allows the access point 102 to communicate with other access points of the network 110. In some cases, the access point 102 can be configured as a repeater to extend wireless coverage of the network 110. Many variations are possible.

In some embodiments, the access point 102 can include a basic service set identifier (BSSID) assignment module 104 and at least one data store 106. The BSSID assignment module 104 can be configured to assign and provide BSSIDs to which the client devices 120-124 can connect to in order to access the network 110. For example, the access point 102 can provide three BSSIDs, one BSSID for each of the client devices 120-124. In this way, each of the client devices 120-124 can fully utilize bandwidth of each BSSID without having to share the bandwidth or experience potential interferences from other neighboring client devices. In some embodiments, the BSSID assignment module 104 can derive BSSIDs based on a media access control (MAC) address of the access point 102. A MAC address is an unique identifier associated with devices connected to the network 100. For example, the access point 102 and each of the client devices 120-124 can have their own unique MAC addresses. In general, a MAC address can comprise a 6-byte value. First three bytes can be associated with a manufacturer or vendor of a device that the MAC address is associated with. Second three bytes can be any combinations of hexadecimal digits. For example, a MAC address of the access point 102 can comprise a hexadecimal value of AB:CD:EF:C0:00:00. In this example, first three bytes (e.g., "AB:CD:EF") of the MAC address identify a manufacturer of the access point 102 and second three bytes (e.g., "C0:00:00") of the MAC address are unique to the access point 102.

In general, because first three bytes of a MAC address are associated with a manufacture or vendor, the first three bytes are fixed and cannot be changed or operated on. Whereas, second three bytes of the MAC address can be changed or operated on without any restrictions or violating wireless standards. Therefore, for simplicity, second three bytes of a MAC address is referred to as a base MAC address of the MAC address. The BSSID assignment module 104, in various embodiments, can derive BSSIDs based on a base MAC address of a MAC address associated with the access point 102. For example, continuing from the example above, the BSSID assignment module 104 can derive BSSIDs for the access point 102 based on a base MAC address of C0:00:00 of the MAC address AB:CD:EF:C0:00:00. In this example, "AB:CD:EF" portion of the MAC address can be appended or concatenated with any hexadecimal digits derived by the BSSID assignment module 104 to generate corresponding BSSIDs. For instance, the BSSID assignment module 104 may generate hexadecimal digits of 80:00:00 based on a base MAC address of C0:00:00. In this instance, a BSSID corresponding to the hexadecimal digits 80:00:00 is simply AB:CD:EF:80:00:00. In this instance, the access point can provide the BSSID of AB:CD:EF:80:00:00 to which the client devices 120-124 can connect to in order to access the network 110. Details of the BSSID assignment module 104 will be discussed in greater detail with respect to FIG. 2 herein.

In some embodiments, the at least one data store 106 can be configured to store a MAC address of the access point 102. In various embodiments, the at least one data store 106 can be implemented using an electronically erasable programmable read-only memory (EEPROM) associated with the access point 102. Because the MAC address of the access point 102 is assigned by a manufacturer of the access point 102, the MAC address can be written and stored in the EEPROM as the access point 102 is manufactured. The BSSID assignment module 104 can access the MAC address of the access point 102 by accessing the at least one data store 106. In some embodiments, the at least one data store 106 can store BSSIDs derived by the BSSID assignment module 104. In some embodiments, the at least one data store 106 can store login credential information (e.g., Wi-Fi Protected Access passwords, Wired Equivalent Privacy passwords, etc.) with which the client devices 120-124 may utilize to connect to the access point 102. In some embodiments, the at least one data store 106 can store instructions that allow the access point to change operational modes. For example, the at least one data store 106 can store instructions that allow the access point 102 to be operated as a bridge or a repeater.

Figure 2:
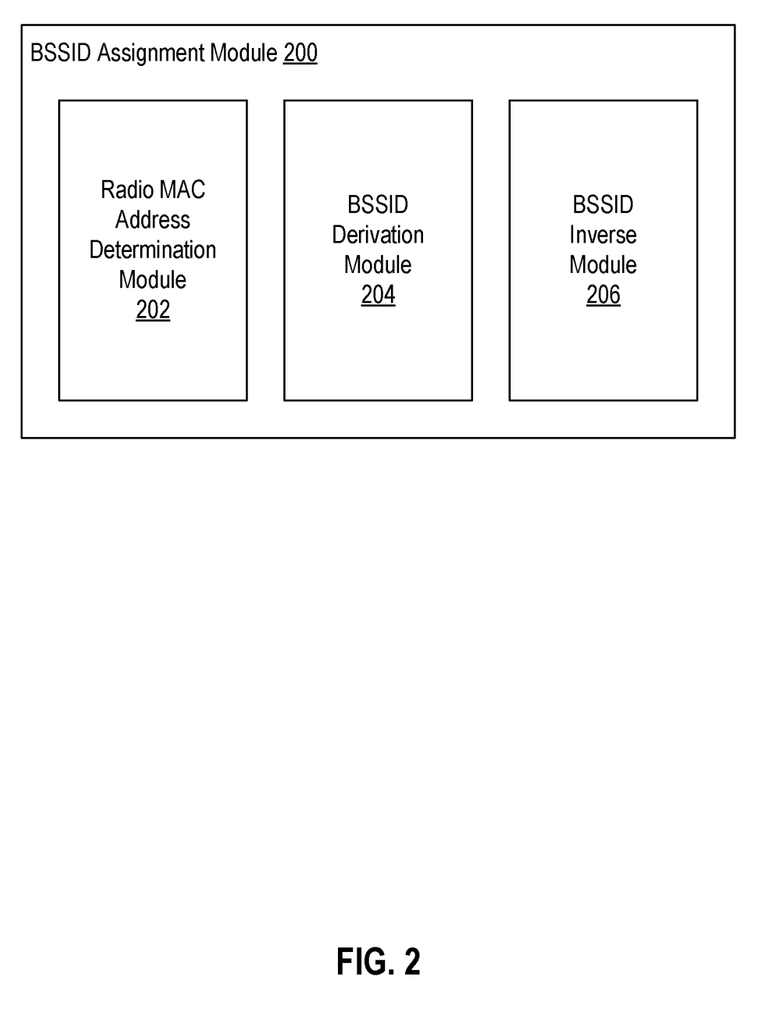
FIG. 2 illustrates an example BSSID assignment module in accordance with various embodiments of the present disclosure.

FIG. 2 illustrates an example BSSID assignment module 200 in accordance with various embodiments of the present disclosure. In some embodiments, the BSSID assignment module 104 of FIG. 1 can be implemented as the BSSID assignment module 200. As discussed with respect to FIG. 1 above, in some embodiments, the BSSID assignment module 200 can derive BSSIDs for an access point (e.g., the access point 102 of FIG. 1) based on a base MAC address of a MAC address of the access point. The BSSID assignment module 200 can obtain the MAC address from a data store (e.g., the at least on data store 106 of FIG. 1) associated with the access point. As shown in FIG. 2, in some embodiments, the BSSID assignment module 200 can comprise a radio MAC address determination module 202, a BSSID derivation module 204, and a BSSID inverse module 206. Each of these modules will be discussed in greater detail below.

In some embodiments, the radio MAC address determination module 202 can be configured to determine a radio-specific MAC address from which a plurality of BSSIDs specific to a radio of the access point can be derived. The radio-specific MAC address can be determined based on a base MAC address of the MAC address of the access point. For example, the access point can have 3 radios operating in frequencies of 2.4 GHz, 5 Ghz, and 6 GHz. In this example, the radio MAC address determination module 202 can derived a radio-specific MAC address for the radio operating in 2.4 GHz, a radio-specific MAC address for the radio operating in 5 GHz, and a radio-specific MAC address for the radio operating in 6 GHz based on the base MAC address. In some embodiments, the radio MAC address determination module 202 can determine a radio-specific MAC address specific to a radio of the access point based on an offset value associated with the radio. An offset value can be determined based on a maximum number of radios supported by an access point and performing a bit-shifting operation to a base MAC address of the access point. For example, an access point can have 3 radios. In this example, a maximum number of radios supported by the access point is 3. The bit-shifting operation is a bitwise operation that shifts binaries corresponding to a base MAC address either to right or left, or some combinations thereof. For example, binaries corresponding to a base MAC address of F0:F0:F0 can be 11110000:11110000:11110000. In this example, if the binaries are shifted to left by four bits and then shifted to right by four bits, the resulting binaries become 00000000: 11110000:11110000 or 00:F0:F0 in hexadecimal. As another example, if binaries corresponding to a base MAC address of C0:00:00 are shifted to left and then right by four bits, the base MAC address would become 00:00:00.

In some embodiments, the radio MAC address determination module 202 can determine an offset value associated with a radio of an access point as follows:

Offset=$(m+r-(e \bmod m)) \bmod m$ where m corresponds to a maximum number of radios supported by the access point, e corresponds to a bit-shifted base MAC address, r corresponds to a radio index, and mod is a modulo operator (e.g., a reminder operator) that return a remainder between a first operand and a second operand. For example, 5 mod 3 returns 2. The radio index is an index of radios supported by the access point. For example, an access point can support 3 radios. In this example, a first radio can have a radio index of 0 (e.g., r=0), a second radio can have a radio index of 1 (e.g., r=1), and a third radio can have a radio index of 3 (e.g., r=3). In some embodiments, e can be determined as follows:

$$e=(base\_mac<<4)>>4$$

where base_mac corresponds to a base MAC address and operators << and >> correspond to bit-shifting operations. For example, the expression <<4 shifts binaries of the base MAC address to left by four bits and the expression >>4 shifts binaries of the base MAC address to right by four bits. Putting it all together, assume for example, an access point can have a MAC address of AB:CD:EF:C0:00:00 and can support 3 radios. In this example, the radio MAC address determination module 202 can determine a radio-specific MAC address for a first radio, a second radio, and a third radio based on a base MAC address of C0:00:00 (i.e., second three bytes of the MAC address). In this example, a bit-shifted base MAC address corresponding to the base MAC address is 00:00:00 or 0 in decimal. Therefore, in this example, the radio MAC address determination module 202 can compute an offset for the first radio of the access point as follows: $Offset_{Radio1}=(3+0-(0 \bmod 3)) \bmod 3$ which equals 0. The radio MAC address determination module 202 can compute an offset for the second radio of the access point as follows: $Offset_{Radio2}=(3+1-(0 \bmod 3)) \bmod 3$ which equals 1. The radio MAC address determination module 202 can compute an offset for the third radio of the access point as follows: $Offset_{Radio3}=(3+2-(0 \bmod 3)) \bmod 3$ which equals 2. These offsets can then be added or incremented to the base MAC address to determine or derive radio-specific MAC addresses for the radios. For example, the radio-specific MAC address for the first radio is C0:00:00 because C0:00:00+0 (e.g., the base MAC address plus offset) is C0:00:00. The radio-specific MAC address for the second radio is C0:00:01 because C0:00:00+1 is C0:00:01. Finally, the radio-specific MAC address for the third radio is C0:00:02 because C0:00:00+2 is C0:00:02. Once the radio MAC address determination module 202 determines the radio-specific MAC addresses of the radios, the radio MAC address determination module 202 can store the radio-specific MAC addresses in the data store.

In some embodiments, the BSSID derivation module 204 can be configured to derive a plurality of BSSIDs for each radio of the access point based on a radio-specific MAC address of each radio. The BSSID derivation module 204 can obtain radio-specific MAC addresses from the data store. In some embodiments, the BSSID derivation module 204 can determine a plurality of BSSIDs for each radio based on a maximum number of BSSIDs to be supported by each radio of the access point and performing a bit-shifting operation and an exclusive OR (e.g., XOR) operation. For example, an access point can have 3 radios with each radio supporting up to 32 BSSIDs (or virtual access points or VAPs). In this example, a maximum number of BSSIDs to be supported by each radio of the access point is 32. As discussed above, the bit-shifting operation is a bitwise operation that shifts binaries corresponding to a radio-specific MAC address to right or left, or some combinations thereof. The XOR operation is a bitwise operation that performs a bit-by-bit XOR logic operation. For example, binaries corresponding to a first hexadecimal value of 0xA is 1010 and binaries corresponding to a second hexadecimal value of 0x3 is 0011. In this example, if 1010 is bitwise XOR'ed with 0011, the resulting binaries are 1001 or 0x9 in hexadecimal. In other words, in a bitwise XOR operation, 1 XOR 1=0, 0 XOR 0=0, 1 XOR 0=1, and 0 XOR 1=1.

In some embodiments, the BSSID derivation module 202 can derive a plurality of BSSIDs for each radio of an access point as follows:

For each radio of an access point:

$$radio\_base\_mac=radio\_base\_mac<<ceil(\log 2(v)) \quad (1)$$

$$radio\_base\_mac=radio\_base\_mac \char`\^ 0x800000 \quad (2)$$

$$j=0$$

For each BSSID to be provided by the radio:

$$bssid=radio\_base\_mac+j \quad (3)$$

$$j=j+1$$

where radio_base_mac corresponds to a radio-specific MAC address, operator << corresponds to a left bit-shifting operation, operator ^ corresponds to a XOR operation, operator ceil is a ceiling operator that rounds a value to its nearest integer that is higher than it, and log 2 operator is a logarithm to the base 2 operator, v corresponds to a maximum number of BSSIDs to be supported by a radio, and j is an index number that increments every time a BSSID is computed or derived. For example, for a radio supporting up to 32 BSSIDs, j increments from 0 to 31 until all 32 BSSIDs are derived. As another example, for a radio supporting up to 16 BSSIDs, j increments from 0 to 15 until all 16 BSSIDs are derived. Putting it all together, assume for example, a radio-specific MAC address for a radio of an access point is C0:00:00 as determined by the radio MAC address determination module 202. In this example, let's further assume that the radio can provide 32 BSSIDs. In this example, v is 32 so ceil(log 2(32)) is 5 and the radio-specific MAC address is bit shifted to left by 5 bits, or from C0:00:00 to 00:00:00, or from 11000000:00000000:00000000 to 00000000:00000000:00000000, at step (1). At step (2), the radio-specific MAC address of 00:00:00 can be XOR'ed with a 6-byte value. In general, the 6-byte value can be any combination of 6-byte values that when XOR'ed with the radio-specific MAC address, allows allocation of any sub-block of usable MAC addresses. In some cases, the 6-byte value can be derived using various techniques. As an example, in some embodiments, the 6-byte value can have a value of 80:00:00 (i.e., 0x800000). In this example, when the radio-specific MAC address is XOR'ed with 80:00:00, the radios-specific MAC address now becomes 80:00:00. From the radio-specific MAC address of 80:00:00, the BSSID derivation module 202 can increment from 80:00:00 to 80:00:1F for each BSSID derived, at step (3). For example, let's assume that the access point has a manufacture identifier of AB:CD:EF, then in this example, a first BSSID to be provided by the radio of the access point is AB:CD:EF:80:00:00, a second BSSID to be provided by the radio of the access point is AB:CD:EF:80:00:01, a third BSSID to be provided by the radio of the access point is AB:CD:EF:80:00:03, etc., and a thirty-second BSSID to be provided by the radio of the access point is AB:CD:EF:80:00:1F.

Table 1 below provides a summary of a plurality of unique BSSIDs that the radio MAC address determination module 202 in conjunction with the BSSID derivation module 204 can derive for an access point with 3 radios and a base MAC address of C0:00:00:

TABLE 1

| Radios | Radio-specific MAC address | BSSIDs |
|---|---|---|
| 1 | 80:00:00 (Offset = 0) | 80:00:00 through 80:00:1F |
| 2 | 80:00:01 (Offset = 1) | 80:00:20 through 80:00:3F |
| 3 | 80:00:02 (Offset = 2) | 80:00:40 through 80:00:5F |

Table 2 below provides a summary of a plurality of unique BSSIDs that the radio MAC address determination module 202 in conjunction with the BSSID derivation module 204 can derive for an access point with 3 radios and a base MAC address of C0:00:01:

TABLE 2

| Radios | Radio-specific MAC address | BSSIDs |
|---|---|---|
| 1 | 80:00:03 (Offset = 2) | 80:00:60 through 80:00:7F |
| 2 | 80:00:01 (Offset = 0) | 80:00:20 through 80:00:3F |
| 3 | 80:00:02 (Offset = 1) | 80:00:40 through 80:00:5F |

Table 3 below provides a summary of a plurality of unique BSSIDs that the radio MAC address determination module 202 in conjunction with the BSSID derivation module 204 can derive for an access point with 3 radios and a base MAC address of C0:00:02:

TABLE 3

| Radios | Radio-specific MAC address | BSSIDs |
|---|---|---|
| 1 | 80:00:03 (Offset = 1) | 80:00:60 through 80:00:7F |
| 2 | 80:00:04 (Offset = 2) | 80:00:80 through 80:00:9F |
| 3 | 80:00:02 (Offset = 0) | 80:00:40 through 80:00:5F |

In some embodiments, the BSSID inverse module 206 can be configured to determine a radio of an access point based on BSSIDs provided by the radio. This reverse step can be important when an administrator of the access point tries to determine radios corresponding to various available BSSIDs to better assess utilization of the radios by client devices. In some embodiments, the BSSID inverse module 206 can determine a radio of an access point as follows:

$$\text{radio\_base\_mac} = \text{bssid} \char`\^ 0x800000 >> \text{ceil}(\log 2(v)) \quad (1)$$

$$\text{radio\_id} = \text{radio\_base\_mac} \bmod m \quad (2)$$

where radio_base_mac corresponds to a radio-specific MAC address, bssid corresponds to a BSSID, radio_id corresponds to radio offset which can be used to determine a radio of an access point, v corresponds to a maximum number of BSSIDs that are supported by a radio, and m corresponds to a maximum number of radios supported by an access point. The various operators have been discussed already. Putting it all together, assume for example, an access point has 3 radios (i.e., m=3) and each radio is broadcasting 32 BSSIDs (i.e., v=32). Further, let's assume in this example, an administrator of the access point is trying to determine a radio that is broadcasting a BSSID of AB:CD:EF:80:00:1A. In this example, at step (1), the BSSID inverse module 206 can determine a radio-specific MAC address corresponding to the BSSID by XORing 80:00:1A with the 6-byte value as used in the BSSID derivation module 204. In this way, the BSSID inverse module 206 can "undo" BSSIDs derivations performed by the BSSID derivation module 204. As an example, in some embodiments, the 6-byte value can have a value of 80:00:00. In this example, XORing 80:00:1A with 80:00:00 results in a hexadecimal value of 00:00:1A. The hexadecimal value of 00:00:1A is then bit-shifted to right by 5 bits (i.e., ceil(log 2(32))=5), which causes the radio-specific MAC address to be 00:00:00. At step (2), the BSSID inverse module 206 can determine a radio offset by performing a modulo operation between 00:00:00 and 3 (i.e., m=3), which causes the radio offset to be 0. Because the administrator already knows the access point's MAC address and, therefore its base MAC address, the administrator can determine the particular radio that was broadcasting the BSSID. For example, if a base MAC address of the access point is C0:00:00 and the radio offset is 0, then the radio that was broadcasting the BSSID of AB:CD:EF:80:00:1A is the first radio of the access point. As another example, if a base MAC address of the access point is C0:00:01 and the radio offset is 0, then the radio that was broadcasting the BSSID of AB:CD:EF:80:00:1A is the second radio of the access point. As yet another example, if a base MAC address of the access point is C0:00:02 and the radio offset is determined to be 0, then the radio that was broadcasting the BSSID of AB:CD:EF:80:00:1A was the third radio of the access point.

Figure 3:
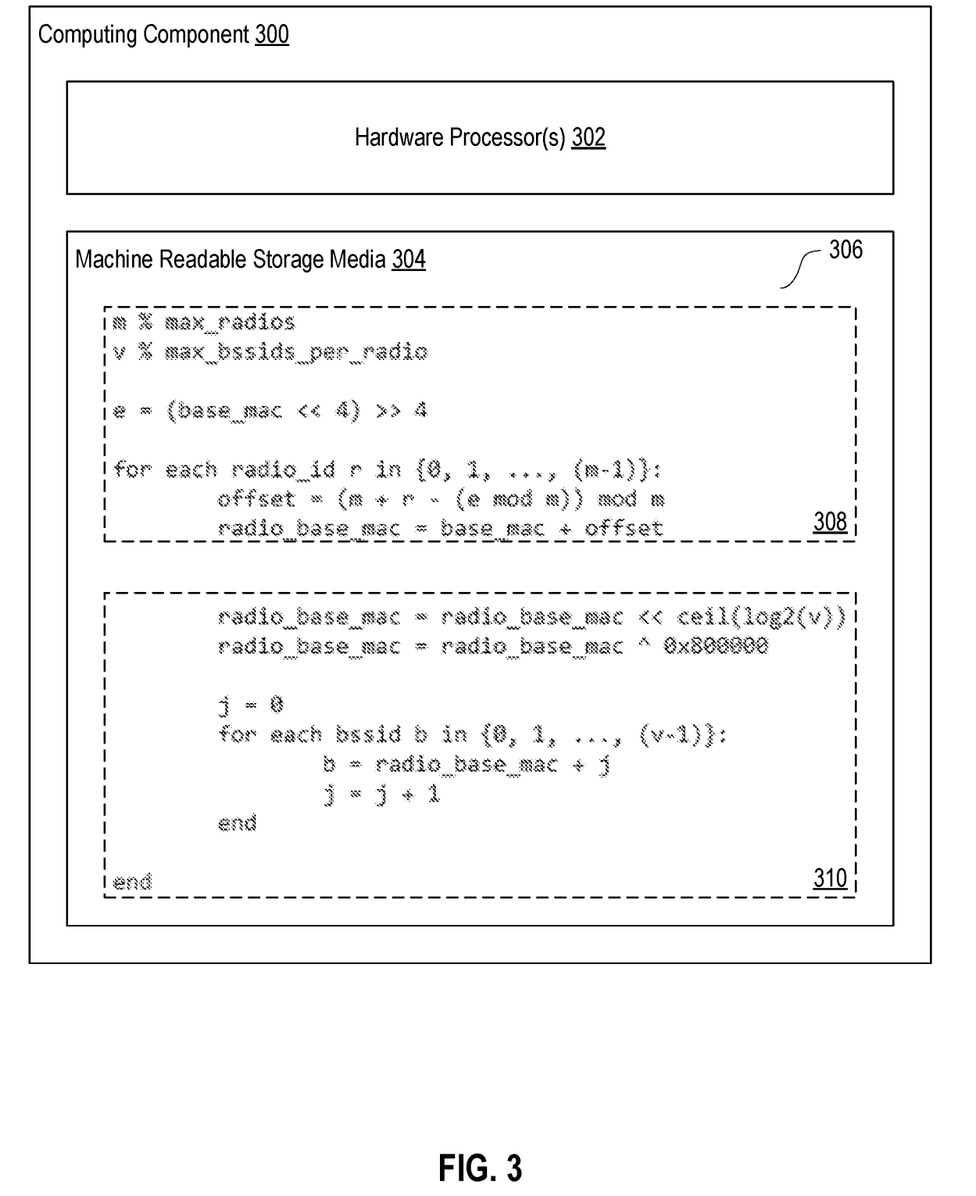
FIG. 3 illustrates an example computing component that can be configured to perform some or all functionalities associated with a radio MAC address determination module and a BSSID derivation module in accordance with various embodiments of the present disclosure.

FIG. 3 illustrates an example computing component 300 that can be configured to perform some or all functionalities associated with a radio MAC address determination module (e.g., the radio MAC address determination module 202 of FIG. 2) and a BSSID derivation module (e.g., the BSSID derivation module 204 of FIG. 2) in accordance with various embodiments of the present disclosure. In some embodiments, the computing component 300 can be an access point (e.g., the access point 102 of FIG. 1). In some embodiments, the computing component 300 can comprise at least one hardware processor 302 and a machine readable storage media 304. The machine readable storage media 304 can store instructions 306. In some embodiments, the instructions 306 can further comprise a first portion 308 and a second portion 310. An execution of the first portion 308 of the instructions 306 by the at least one hardware processor 402 can cause the computing component 300 to perform some or all functionalities associated with the radio MAC address determination module. An execution of the second portion 310 of the instructions 306 by the at least one hardware processor 402 can cause the computing component 300 to perform some or all functionalities associated with the BSSID derivation module. Details of the instructions 306 have already been discussed with respect to the radio MAC address determination module 202 and the BSSID derivation module 204 of FIG. 2 above.

Figure 4:
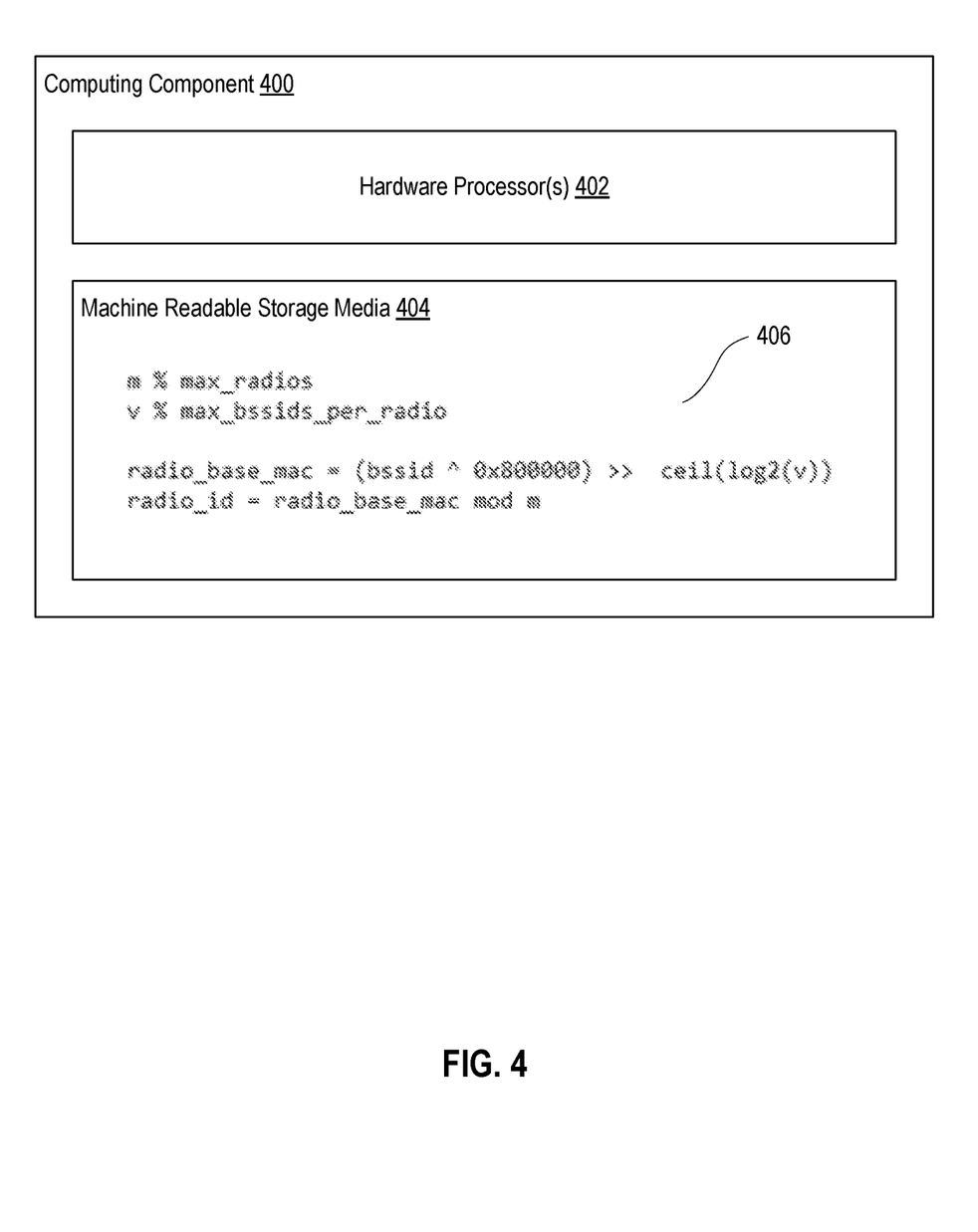
FIG. 4 illustrates an example computing component that can be configured to perform some or all functionalities associated with a BSSID inverse module in accordance with various embodiments of the present disclosure.

FIG. 4 illustrates an example computing component 400 that can be configured to perform some or all functionalities associated with a BSSID inverse module (e.g., the BSSID inverse module 206 of FIG. 2) in accordance with various embodiments of the present disclosure. In some embodiments, the computing component 400 can be an access point (e.g., the access point 102 of FIG. 1). In some embodiments, the computing component 400 can comprise at least one hardware processor 402 and a machine readable storage media 404. The machine readable storage media 404 can store instructions 406 that when executed by the at least one hardware processor 402, cause the computing component 400 to perform some or all functionalities associated with the BSSID inverse module. Details of the instructions 406 have already been discussed with respect to the BSSID derivation module 206 of FIG. 2 above.

Figure 5:
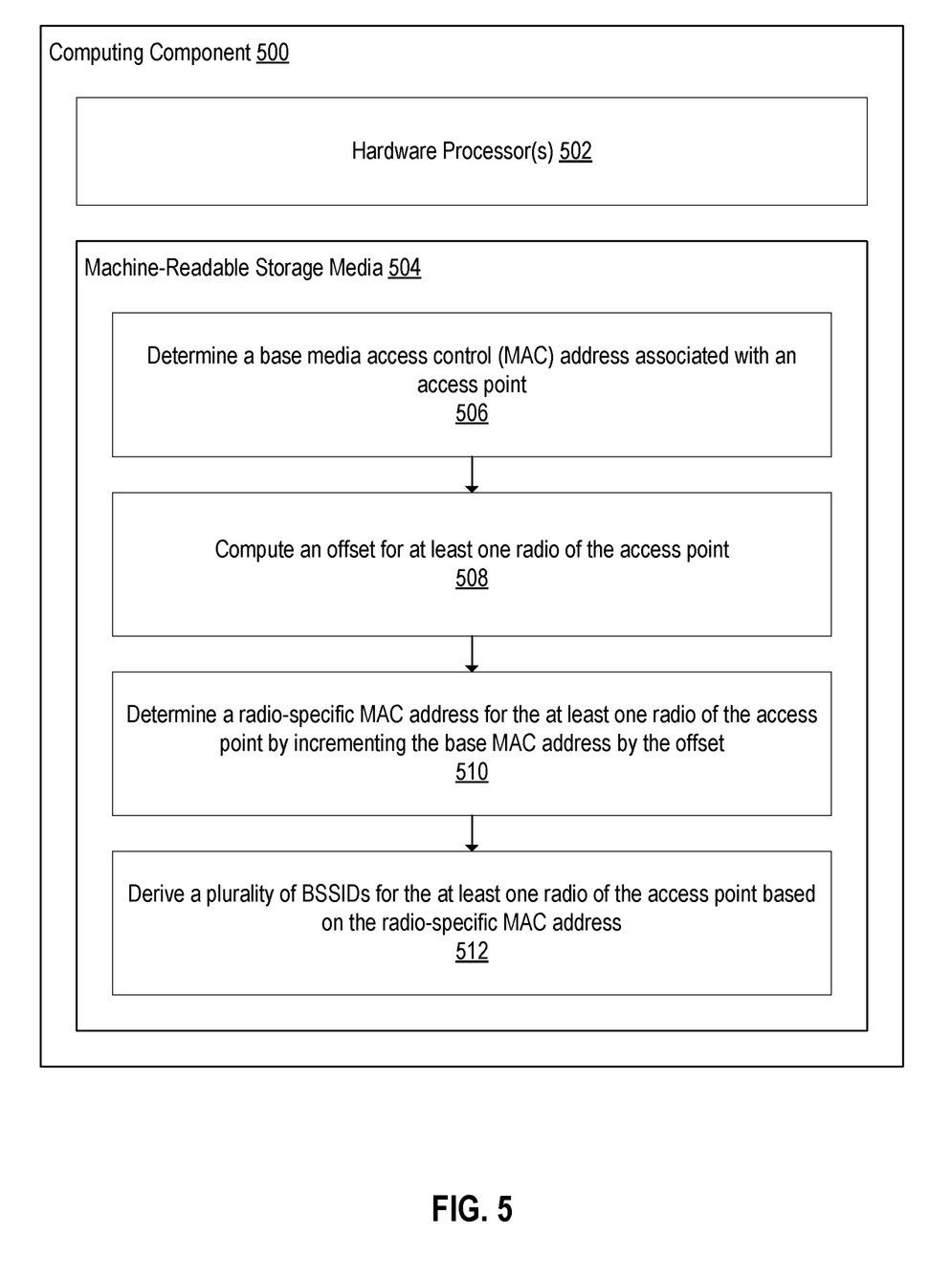
FIG. 5 illustrates a computing component that includes one or more hardware processors and machine-readable storage media storing a set of machine-readable/machine-executable instructions that, when executed, cause the hardware processor(s) to perform an illustrative method for deriving BSSIDs for an access point in accordance with various embodiments of the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method for deriving BSSIDs for an access point in accordance with various embodiments of the present disclosure. The computing component 500 may be, for example, the computing system 600 of FIG. 6. The hardware processors 502 may include, for example, the processor(s) 604 of FIG. 6 or any other processing unit described herein. The machine-readable storage media 504 may include the main memory 606, the read-only memory (ROM) 608, the storage 610 of FIG. 6, and/or any other suitable machine-readable storage media described herein.

At block 506, the hardware processor(s) 502 may execute machine-readable/machine-executable instructions stored in the machine-readable storage media 504 to determine a base media access control (MAC) address associated with an access point. In some embodiments, the base MAC address can be determined based on a MAC address of the access point.

At block 508, the hardware processor(s) 502 may execute machine-readable/machine-executable instructions stored in the machine-readable storage media 504 to compute an offset for at least one radio of the access point. In some embodiments, the offset for the at least one radio of the access point can be determined by performing at least one modulo operation between a bit-shifted base MAC address and a number of radios supported by the access point.

At block 510, the hardware processor(s) 502 may execute machine-readable/machine-executable instructions stored in the machine-readable storage media 504 to determine a radio-specific MAC address for the at least one radio of the access point. In some embodiments, the radio-specific MAC address for the at least one radio of the access point can be determined by incrementing the base MAC address with the offset.

Finally, at block 512, the hardware processor(s) 502 may execute machine-readable/machine-executable instructions stored in the machine-readable storage media 504 to derive a plurality of BSSIDs for the at least one radio of the access point based on the radio-specific MAC address. In some embodiments, the plurality of BSSIDs can be derived by incrementing the radio-specific MAC address that has been bit shifted and exclusive OR'ed.

Figure 6:
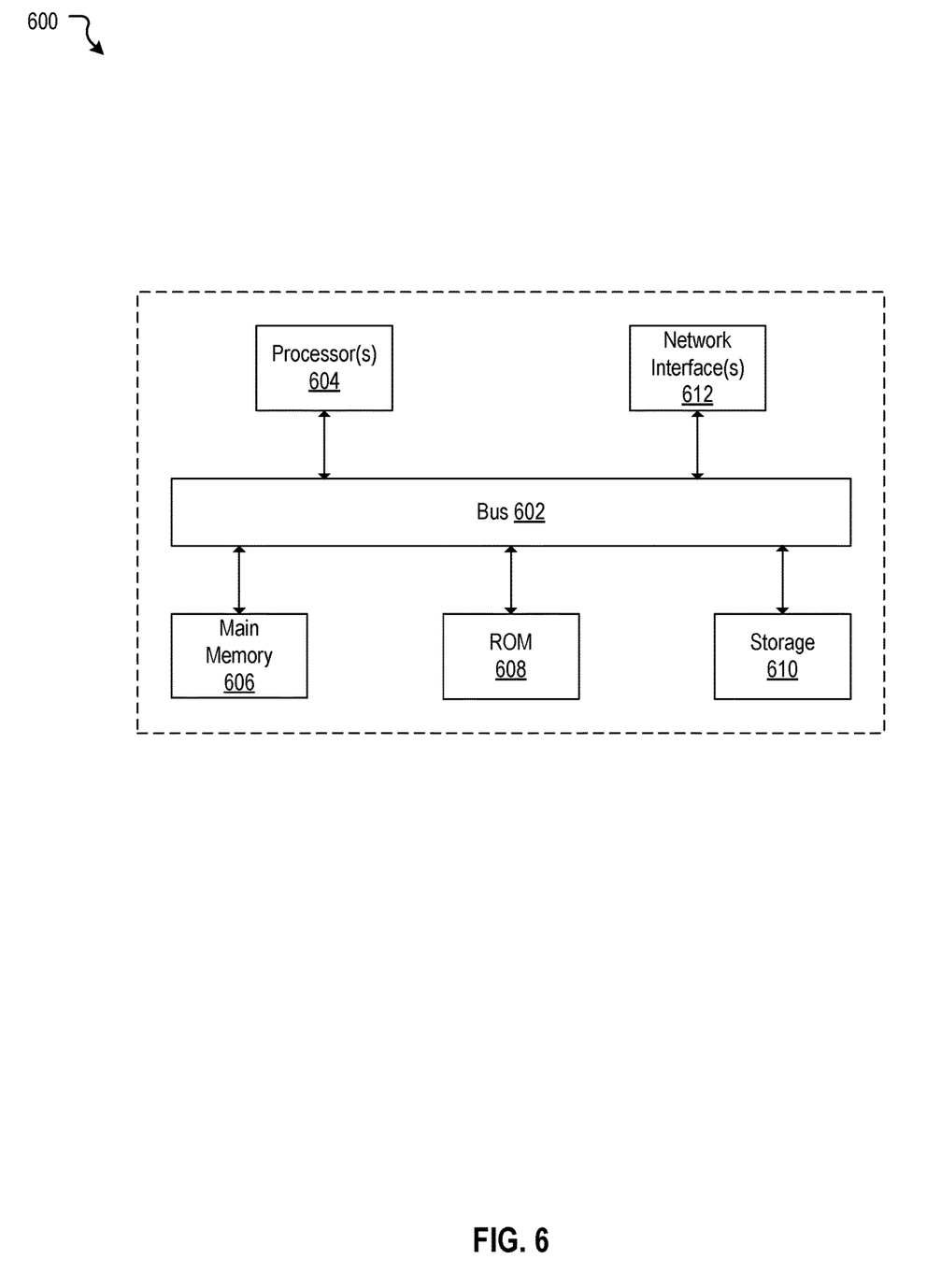
FIG. 6 illustrates a block diagram of an example computer system with which various embodiments of the present disclosure may be implemented.

FIG. 6 illustrates a block diagram of an example computer system 600 with which various embodiments of the present disclosure may be implemented. The computer system 600 can include a bus 602 or other communication mechanism for communicating information, one or more hardware processors 604 coupled with the bus 602 for processing information. The hardware processor(s) 604 may be, for example, one or more general purpose microprocessors. The computer system 600 may be an embodiment of an access point or similar device.

The computer system 600 can also include a main memory 606, such as a random access memory (RAM), cache and/or other dynamic storage devices, coupled to the bus 602 for storing information and instructions to be executed by the hardware processor(s) 604. The main memory 606 may also be used for storing temporary variables or other intermediate information during execution of instructions by the hardware processor(s) 604. Such instructions, when stored in a storage media accessible to the hardware processor(s) 604, render the computer system 600 into a special-purpose machine that can be customized to perform the operations specified in the instructions.

The computer system 600 can further include a read only memory (ROM) 608 or other static storage device coupled to the bus 602 for storing static information and instructions for the hardware processor(s) 604. A storage device 610, such as a magnetic disk, optical disk, or USB thumb drive (Flash drive), etc., can be provided and coupled to the bus 602 for storing information and instructions.

Computer system 600 can further include at least one network interface 612, such as a network interface controller module (NIC), network adapter, or the like, or a combination thereof, coupled to the bus 602 for connecting the computer system 600 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAs, firmware and/or program logic which in combination with the computer system 600 that causes or programs the computer system 600 to be a special-purpose machine. According to one or more embodiments, the techniques described herein are performed by the computer system 600 in response to the hardware processor(s) 604 executing one or more sequences of one or more instructions contained in the main memory 606. Such instructions may be read into the main memory 606 from another storage medium, such as the storage device 610. Execution of the sequences of instructions contained in the main memory 606 can cause the hardware processor(s) 604 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 610. The volatile media can include dynamic memory, such as the main memory 606. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 602. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of deriving basic service set identifiers (BSSIDs), the method comprising:
   determining a base media access control (MAC) address associated with an access point;
   computing an offset for at least one radio of the access point;
   determining a radio-specific MAC address for the at least one radio of the access point by incrementing the base MAC address by the offset; and
   deriving a plurality of BSSIDs for the at least one radio of the access point based on the radio-specific MAC address.

2. The computer-implemented method of claim 1, wherein the base MAC address is based on a MAC address of the access point.

3. The computer-implemented method of claim 1, wherein computing the offset for the at least one radio of the access point comprises:
   determining a number of radios supported by the access point;
   performing a first bit-shifting operation on the base MAC address; and
   performing at least one modulo operation between the bit-shifted base MAC address and the number of radios.

4. The computer-implemented method of claim 3, wherein the first bit-shifting operation comprises shifting binaries corresponding to the base MAC address to left by a first number of bits and shifting the binaries to the right by the first number of bits.

5. The computer-implemented method of claim 1, wherein deriving the plurality of BSSIDs for each radio of the access point comprises:
   performing a second bit-shifting operation on the radio-specific MAC address;
   performing a bitwise operation on the bit-shifted radio-specific MAC address; and
   for each BSSID of the plurality of BSSIDs, incrementing the bitwise operated radio-specific MAC address by an index value.

6. The computer-implemented method of claim 5, wherein the second bit-shifting operation comprises shifting binaries corresponding to the radio-specific MAC address by a second number of bits.

7. The computer-implemented method of claim 6, wherein the second number of bits is determined based on a number of BSSIDs to be supported by the at least one radio of the access point.

8. The computer-implemented method of claim 5, wherein the bit-shifted radio-specific MAC address is bitwise operated with a hexadecimal value.

9. The computer-implemented method of claim 1, further comprising:
   deriving a radio offset corresponding to a radio of the access point based on at least one BSSID of the plurality of BSSIDs.

10. The computer-implemented method of claim 9, wherein deriving the radio offset corresponding to the radio of the access point comprises:
   performing a bitwise operation on operation on the at least on BSSID
   determining a number of radios supported by the access point;
   performing a third bit-shifting operation on the bitwise operated BSSID based on the number of radios supported by the access point; and
   performing a modulo operation between the bit-shifted BSSID and the number of radios.

11. An access point comprising
   at least one processor; and
   a memory storing instructions that, when executed by the at least one processor, cause the access point to perform a method of deriving basic service set identifiers (BSSIDs), the method comprising:
      determining a base media access control (MAC) address associated with the access point;
      computing an offset for at least one radio of the access point;
      determining a radio-specific MAC address for the at least one radio of the access point by incrementing the base MAC address by the offset; and
      deriving a plurality of BSSIDs for the at least one radio of the access point based on the radio-specific MAC address.

12. The access point of claim 11, wherein computing the offset for the at least one radio of the access point comprises:
   determining a number of radios supported by the access point;
   performing a first bit-shifting operation on the base MAC address; and performing at least one modulo operation between the bit-shifted base MAC address and the number of radios.

13. The access point of claim 12, wherein the first bit-shifting operation comprises shifting binaries corresponding to the base MAC address to left by a first number of bits and shifting the binaries to the right by the first number of bits.

14. The access point of claim 11, wherein deriving the plurality of BSSIDs for each radio of the access point comprises:
performing a second bit-shifting operation on the radio-specific MAC address;
performing a bitwise operation on the bit-shifted radio-specific MAC address; and
for each BSSID of the plurality of BSSIDs, incrementing the bitwise operated radio-specific MAC address by an index value.

15. The access point of claim 14, wherein the second bit-shifting operation comprises shifting binaries corresponding to the radio-specific MAC address by a second number of bits, and wherein the second number of bits is determined based on a number of BSSIDs to be supported by the at least one radio of the access point.

16. A non-transitory storage medium storing instructions that, when executed by at least one processor of an access point, cause the access point to perform a method of deriving basic service set identifiers (BSSIDs), the method comprising:
determining a base media access control (MAC) address associated with the access point;
computing an offset for at least one radio of the access point;
determining a radio-specific MAC address for at least one radio of the access point by incrementing the base MAC address by the offset; and
deriving a plurality of BSSIDs for the at least one radio of the access point based on the radio-specific MAC address.

17. The non-transitory medium of claim 16, wherein computing the offset for the at least one radio of the access point comprises:
determining a number of radios supported by the access point;
performing a first bit-shifting operation on the base MAC address;
performing at least one modulo operation between the bit-shifted base MAC address and the number of radios.

18. The non-transitory medium of claim 17, wherein the first bit-shifting operation comprises shifting binaries corresponding to the base MAC address to left by a first number of bits and shifting the binaries to the right by the first number of bits.

19. The non-transitory medium of claim 16, wherein deriving the plurality of BSSIDs for each radio of the access point comprises:
performing a second bit-shifting operation on the radio-specific MAC address;
performing a bitwise operation on the bit-shifted radio-specific MAC address; and
for each BSSID of the plurality of BSSIDs, incrementing the bitwise operated radio-specific MAC address by an index value.

20. The non-transitory medium of claim 19, wherein the second bit-shifting operation comprises shifting binaries corresponding to the radio-specific MAC address by a second number of bits, and wherein the second number of bits is determined based on a number of BSSIDs to be supported by the at least one radio of the access point.

* * * * *